United States Patent [19]

Jorgensen

[11] Patent Number: 4,580,490

[45] Date of Patent: Apr. 8, 1986

[54] APPARATUS FOR PRODUCING UNITS FIT FOR PACKING PREFERABLY OF A CHEESE PRODUCT OF THE TYPE CHEESE-BASE

[75] Inventor: Eskild B. Jorgensen, Silkeborg, Denmark

[73] Assignee: Pasilac A/S, Denmark

[21] Appl. No.: 659,350

[22] Filed: Oct. 10, 1984

[30] Foreign Application Priority Data

Oct. 21, 1983 [DK] Denmark .............................. 4843/83

[51] Int. Cl.⁴ ...................... A01J 25/00; A23C 19/00
[52] U.S. Cl. ........................................ 99/452; 99/460; 425/308; 425/310
[58] Field of Search .................. 99/452, 453, 456–459, 99/460–465, 537; 426/36, 582; 425/317, 289, 296, 308, 310, 311

[56] References Cited

U.S. PATENT DOCUMENTS 3,774,304 11/1973 Bronkhorst et al. ................. 99/460
4,401,679 8/1983 Rubin et al. .................... 426/582 X

FOREIGN PATENT DOCUMENTS 2112028 9/1971 Fed. Rep. of Germany .

OTHER PUBLICATIONS

Ernstrom et al., Journal of Dairy Science, vol. 63, No. 2, (Feb. 1980), pp. 228–234.

Primary Examiner—Timothy F. Simone
Attorney, Agent, or Firm—Lowe, Price, LeBlanc, Becker & Shur

[57] ABSTRACT

An apparatus for producing units fit for packing, preferably of a cheese product of the type cheese-base, is adapted to be connected to a cheese-base production system from which the cheese-base is pressed out in a continuous flow. The apparatus comprises an accumulating pipe connectable to the discharge pipe of the cheese-base production system. This accumulation pipe expands in the flow direction and ends in a cylindrical pipe section of a first greater sectional area. Subsequently, the cylindrical pipe section of the accumulating pipe is connected to a cylindrical extrusion pipe of a second smaller sectional area. At the discharge end of the extrusion pipe, a cutting device is provided for cutting desired lengths of the extrudate. This apparatus allows production of cheese-base units in a suitable size fit for further handling and transport.

9 Claims, 1 Drawing Figure

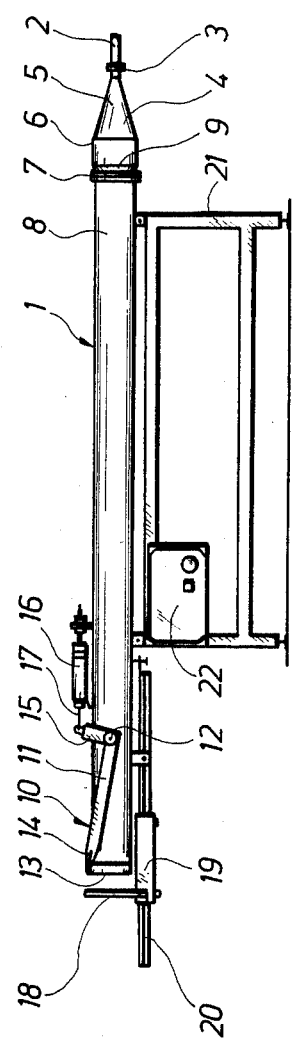

4,580,490

APPARATUS FOR PRODUCING UNITS FIT FOR PACKING PREFERABLY OF A CHEESE PRODUCT OF THE TYPE CHEESE-BASE

FIELD OF THE INVENTION

The invention relates to an apparatus for producing units fit for packing preferably of a cheese product of the type cheese-base, said apparatus being connectable to a cheese-base production system, from which the cheese-base is pressed out in a continuous flow through a discharge pipe from a positive displacement pump.

BACKGROUND ART

The cheese product marketed as cheese-base is a product with a dry matter content of about 60% and a viscosity corresponding to the dough of rye bread when it leaves the production system with a temperature of about 40° C. It is generally known to produce cheese-base, the processing being described for instance in the U.S. Pat. No. 4,401,679 or in the American Journal: Journal of Dairy Science, vol. 63, No. 2, February 1980, pages 228–234, "Cheese-base for processing a high yield product from whole milk by ultrafiltration", written by professor C. A. Ernstrom et al., Utah State University. When the cheese-base leaves the production system, it is pumped out of a positive displacement pump connected to said system and subsequently pumped through the discharge pipe thereof. This discharge pipe is of a diameter corresponding to the capacity of the pump. The diameter implies that a cheese-base strand unfit for packing is produced. The discharged cheese-base is especially unfit for packing in boxes of a specific shape since it is unable to flow out by itself and form a homogeneously distributed product fit for further transport, optionally for sale purposes. The cheese-base cannot therefore be treated in the same manner as other cheese products such as cheese spread.

SUMMARY OF THE INVENTION

The object of the invention is to provide an apparatus allowing a production of cheese-base units fit for packing and further transport.

The apparatus according to the invention is characterized in that the apparatus comprises an accumulating pipe connectable to the discharge pipe and expanding in the flow direction and ending in a cylindrical pipe section of a first greater sectional area, that the cylindrical pipe section of the accumulating pipe is connected to a cylindrical extrusion pipe of a second smaller sectional area, and that a cutting device is provided at the discharge end of the extrusion pipe for cutting desired lengths of the extrudate.

In this manner units of the cheese-base can be produced with a suitable sectional shape and in suitable lengths fit for further transport. The combination of the accumulating pipe and the extrusion pipe implies that the accumulation of the cheese-base flow before the accumulating pipe is sufficient for filling out the extrusion pipe completely and homogeneously over its entire sectional area. The extrusion method used ensures that the extrudate leaving the extrusion pipe forms a homogeneous mass with a nice outer surface. Lumps in the form of rectangular prisms and with a weight of 25 kg may for instance suitably be produced by this method, said lumps being fit for piling on pallets and further transport, whereby they are situated preferably in a manner known per se in a plastic bag being vacuumed, closed, and shrunk whereafter the plastic bag with contents is placed in a carton. The meaning of cylindrical is that the pipe sections in question are bodies, the surface of which is defined by a closed planar curve, which for instance may be rectangular, as well as a straight generatrix.

The above first sectional area may according to the invention be so much greater than the said second sectional area that the cheese-base is provided with a sectional area reduction of from about 10 to 20% when passing from the accumulating pipe into the extrusion pipe, whereby a particularly nice and homogeneous product is obtained.

Furthermore according to the invention the cutting device may comprise a cutting device holder pivotably mounted on the side of the extrusion pipe, and the said cutting device holder may extend from an axis of rotation along the extrusion pipe and to immediately adjacent the discharge end thereof, where it carries a cutting means activated by turning the cutting device holder about its axis of rotation. In this manner it is possible to place bags about the discharge end of the extrusion pipe and the adjacent portion of the cutting device in such a manner that the extrudate passes directly into a plastic bag and can be cut therein at a desired time. As a result, a good security against contamination of the extrudate is obtained.

According to the invention it is particularly advantageous that the cutting device holder comprises two arms extending in parallel on each side of the extrusion pipe, said arms being rigidly interconnected and carrying the cutting means in the form of a cutting strand at their outermost free ends.

Finally according to the invention the cutting device holder may be automatically activatable by means of a piston and cylinder assembly when the extrudate is of a desired predetermined length.

BRIEF DESCRIPTION OF DRAWING

The invention will be described below with reference to the accompanying drawing in the form of a single FIGURE showing a diagrammatical side view of an embodiment of the apparatus according to the invention.

DESCRIPTION OF PREFERRED EMBODIMENTS

The apparatus shown in the FIGURE is provided with the general reference numeral 1 and comprises an inlet pipe 2. In the illustrated embodiment this inlet pipe is a bent pipe extending backwards when seen relative to the drawing. At the back this pipe is connected to a discharge pipe from a positive displacement pump of a generally known system (not shown) for producing cheese-base. The end shown of the inlet pipe 2 is connected to an accumulating pipe 4 through a flange connection 3. The accumulating pipe 4 comprises a section 5 having a sectional area increasing continuously up to a cylindrical section 6 having a greater first sectional area. The cylindrical pipe section 6 of the accumulating pipe 4 communicates with a cylindrical extrusion pipe 8 through a flange connection 7. The extrusion pipe 8 is of a second sectional area slightly smaller than the first sectional area of the accumulating pipe within the cylindrical pipe section 6. As it appears from the drawing, a small pipe section 9 is provided between the cylindrical pipe section 6 of the accumulating pipe 4 and the end at which the accumulating pipe 4 is connected to the extrusion pipe 8. This small pipe section 9 narrows to a sectional area corresponding to the sectional area of the extrusion pipe 8. At the end opposite the accumulating pipe 4, the extrusion pipe 8 carries a cutting device provided with the general reference numeral 10. The cutting device comprises two arms 11 extending symmetrically on each side of the axial central plane of the extrusion pipe 8, only one arm appearing from the drawing. These arms are pivotably mounted about a common axis of rotation 12 and extend forward parallel to the extrusion pipe and forward to the immediate vicinity of the discharge end 13 of the extrusion pipe where they carry a cutting means 14 in the form of a strand extending transversely to the discharge end.

At the end adjacent the axis of rotation, the arms 11 are interconnected by means of a permanent connecting member 15 extending across the upper side of the extrusion pipe 8. On the upper side of the extrusion pipe, a piston and cylinder assembly 16 is situated behind the connecting member. The piston rod 17 of this assembly is connected to the connecting member 15 between the arms 11 in the cutting device. When the piston and cylinder assembly 16 is activated, the arms 11 are turning about their axis of rotation 12 and thereby the cutting strand 14 passes transversely across the discharge end 13 of the extrusion pipe 8.

A vertical plate 18 is provided directly opposite the discharge end 13 of the extrusion pipe 8. This plate is supported by a vehicle displaceably positioned on slides 20 extending parallel to the axis of the extrusion pipe. The vehicle 19 is adapted to cooperate with an adjustable sensor (not shown) when it has been moved a predetermined distance in a direction away from the discharge end 13 of the extrusion pipe 8. This sensor is adapted to activate the piston and cylinder assembly 16 of the cutting device 10.

As shown, the apparatus is placed on a frame 21 with a suitable control desk 22.

The pipes of the apparatus are made of stainless steel polished and optionally coated with teflon on the inner side. The inlet pipe 2 comprises a diameter of about 100 mm, viz. a diameter of the same magnitude as the discharge pipe of a positive displacement pump such as a gear pump usually used in a cheese-base production system. The extrusion pipe 8 is of a length of about 2 m in the preferred embodiment and of a rectangular inner sectional area of 290×220 mm. The accumulating pipe 4 is of a length of about 30 cm over the cylindrical pipe section and of an inner rectangular sectional area of 310×240 mm. The latter sectional area is of such a size that a 15% area reduction is ensured at the passage from the accumulating pipe 4 to the extrusion pipe 8.

The apparatus is used in the following manner: From the cheese-base production system the cheese-base is pressed continuously through the inlet pipe 2 and into the accumulating pipe 4. In the accumulating pipe the cheese-base is accumulated to such a degree that from said pipe the cheese-base enters the extrusion pipe and fills out said extrusion pipe completely over its entire sectional area. At the discharge end 13 of the extrusion pipe 8, the extrudate flows out continuously and abuts the plate 18 on the vehicle 19. As a result, the vehicle is displaced to the left when seen relative to the drawing, and after a predetermined running length the cutting device 10 is activated to cut the continuously flowing strand by passing the cutting strand 14 transversely to the discharge end 13. The illustrated embodiment of the apparatus is suitably used together with packing bags of plastics, which are positioned either manually or automatically about the discharge end 13 of the extrusion pipe 8 and the adjacent portion of the cutting device. As a result, the extrudate is placed directly in the bottom of the plastic bag and implies thereby that said bag follows the further movement together with the plate 18 and the vehicle 19. Thus the cutting of the extrudate may be carried out in the plastic bag whereafter the plastic bag with the lump cut off can be removed either manually or mechanically for further handling.

The invention has been described with reference to a preferred embodiment. Many alterations may be carried out without thereby deviating from the scope of the invention. The said lengths may, for instance, be varied to a great extent.

I claim:

1. An apparatus for producing extrudable product units of predetermined extruded shape and size, connectable to a system to receive said product therefrom under pressure via a delivery pipe of known cross-section, said apparatus comprising:

an accumulator pipe, connectable to said system at an upstream first end having a predetermined first cross-section which matches said delivery pipe cross section, a downstream second end of said accumulator pipe having a second predetermined cross-section larger than said first cross-section, and a length along which the increase in cross-section between said first end and second end occurs continuosly;

a short pipe connected at an upstream third end to said second end of said accumulator pipe and having a constant cross-section matching said second cross-section thereof in shape and size, said short pipe having a small portion of its length tapering axially inward to a downstream fourth end having a third cross-section of predetermined shape and size somewhat smaller than said second cross section;

an extrusion pipe of constant cross section, matching in shape and size said third cross-section of said short pipe, said extrusion pipe at an upstream fifth end being contiguous with said downstream fourth end of said short pipe and having a downstream sixth end from which said extrudate issues; and cutting means adjacent said downstream sixth end of said extrusion pipe for cutting off extrudate issuing therefrom to produce said product units of predetermined length.

2. Apparatus according to claim 1, wherein:
   the area of said third cross-section is less than the area of said second cross-section by between 15% and 20%.

3. Apparatus according to claim 1, wherein:
   the internal surfaces of said connected accumulator pipe, short pipe and extrusion pipe together provide a smooth contiguous passageway to said product extruded therethrough from said system.

4. Apparatus according to claim 1, wherein:
   said passageway is provided with a coating of a low friction material.

5. Apparatus according to claim 4, wherein:
   said material is Teflon TM.

6. Apparatus according to claim 1, wherein:
   said cutting means comprises two similar, parallel, rigid, interconnected arms, each pivoting about a common horizontal axis at a first end about a pivot attached to one side of said extrusion pipe, and a cutting strand carried between the second ends of said first and second arms so that pivoting of said arms will cause said cutting strand to cut through extrudate leaving said extrusion pipe.

7. Apparatus according to claim 6, futher comprising:
extrudate supporting means slidably supported adjacent said sixth end for supporting said extrudate issuing therefrom while said cutting means acts to produce said units therefrom.

8. Apparatus according to claim 7, further comprising:
actuation means, connected to said cutting means, for actuating said cutting means to cut said supported extrudate into units of predetermined length.

9. Apparatus according to claim 8, wherein:
said actuating means is coupled to said slidable extrudate support means to actuate said cutting means in response to a predetermined amount of sliding by said support means as said extrudate issues thereon from said extrusion pipe.

* * * * *